(No Model.) 3 Sheets—Sheet 1.

M. W. DEWEY.
AUTOGRAPHIC TELEGRAPHY.

No. 405,539. Patented June 18, 1889.

WITNESSES:
J. J. Laass
N. H. Randall

INVENTOR
Mark W. Dewey
BY
Duell, Laass & Duell
ATTORNEYS (No Model.) 3 Sheets—Sheet 2.

M. W. DEWEY.
AUTOGRAPHIC TELEGRAPHY.

No. 405,539. Patented June 18, 1889.

WITNESSES:
J. J. Laass
W. H. Randall.

INVENTOR
Mark W. Dewey
BY
Duell, Laass & Duell
ATTORNEYS (No Model.) 3 Sheets—Sheet 3.

M. W. DEWEY.
AUTOGRAPHIC TELEGRAPHY.

No. 405,539. Patented June 18, 1889.

WITNESSES:
J. J. Laass
W. H. Randall.

INVENTOR
Mark W. Dewey
BY
Duell, Laass & Duell
ATTORNEYS

UNITED STATES PATENT OFFICE.

MARK W. DEWEY, OF SYRACUSE, NEW YORK, ASSIGNOR, BY DIRECT AND MESNE ASSIGNMENTS, TO THE DEWEY CORPORATION, OF SAME PLACE.

AUTOGRAPHIC TELEGRAPHY.

SPECIFICATION forming part of Letters Patent No. 405,539, dated June 18, 1889.

Application filed September 22, 1888. Serial No. 286,098. (No model.)

*To all whom it may concern:*

Be it known that I, MARK W. DEWEY, of Syracuse, in the county of Onondaga, in the State of New York, have invented new and useful Improvements in Autographic Telegraphy, of which the following, taken in connection with the accompanying drawings, is a full, clear, and exact description.

This invention consists in further improvements in autographic telegraphy which may be applied to the system shown and described in a prior application for Letters Patent, Serial No. 276,354, filed June 7, 1888.

The advantages obtained by my present improvements are as follows:

First. A large field or range of movement of both the transmitting and the receiving pens is obtained, so that a page of writing may be done without moving the paper.

Second. The stylus or pen of transmitter is sustained at the ends of universally-jointed arms and is free from strains of springs pulling in certain directions, which interfere with the free movement of the hand in writing, and can be left in contact with the paper in any position without moving.

Third. Convenient means are provided for raising and lowering the receiving stylus or pen automatically without raising and lowering the handle of transmitting stylus or pen in an autographic telegraph actuated by varying strength of current or impulses.

Fourth. The paper at the receiving-station is moved automatically with the movement of the paper at the transmitting-station by the movement of styluses or pens.

Fifth. Simple and efficient means are provided for varying the resistance in an electric circuit by varying the amplitude of vibration of a reed.

Sixth. A transmitting stylus or pen is so formed as to serve as a circuit maker and breaker for automatically effecting the raising or lowering of the receiving-pen; and various other advantages are derived by my invention, as hereinafter fully described, and specifically set forth in the claims.

Figure 1:
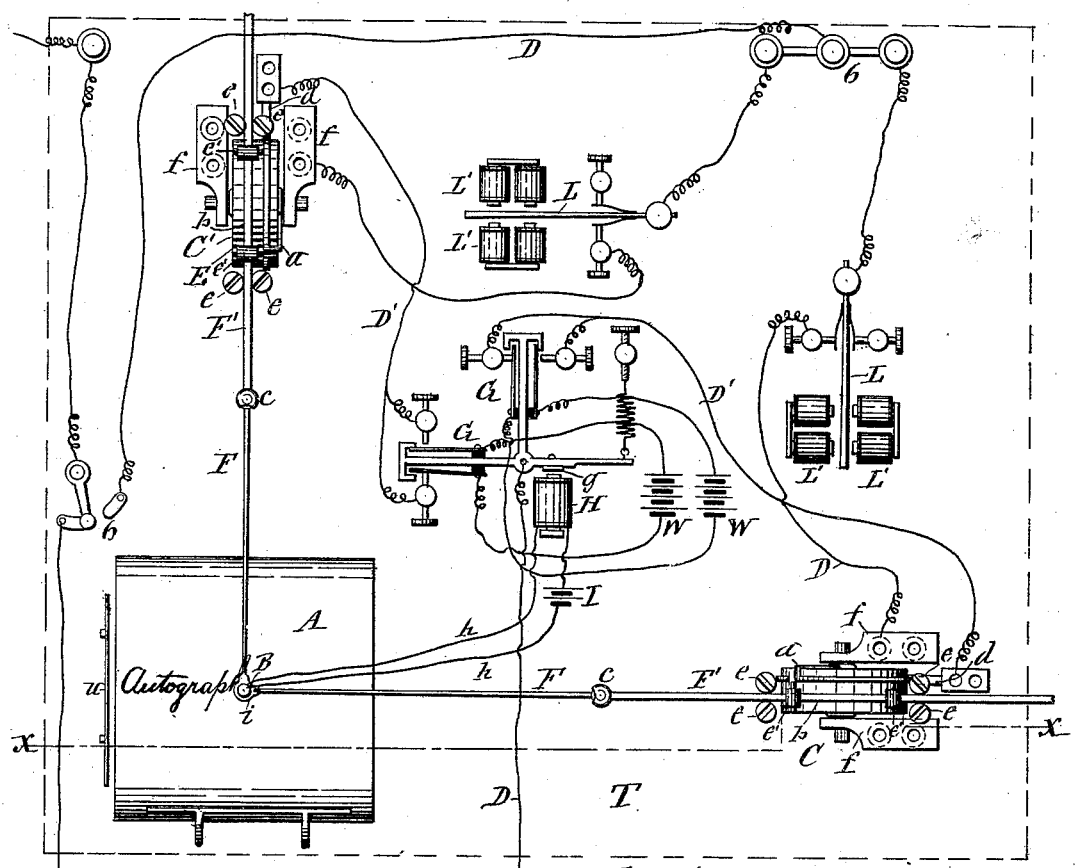
Figure 2:
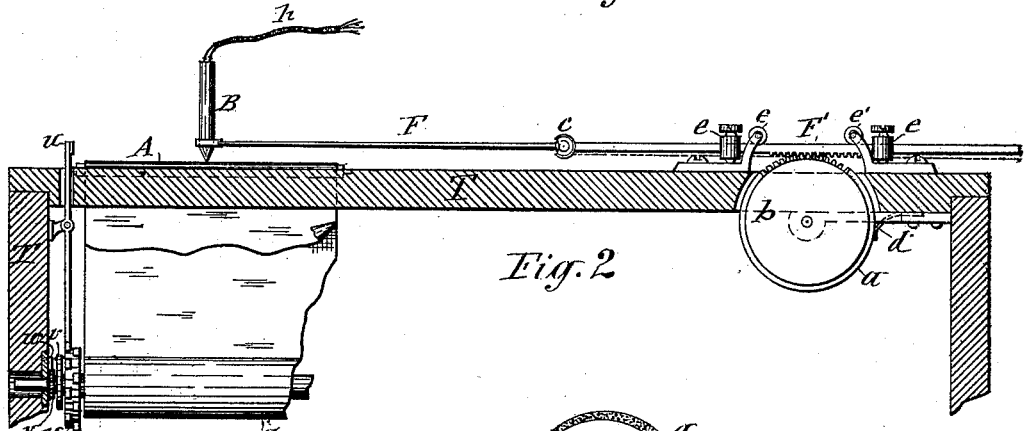
Figures 5, 6:
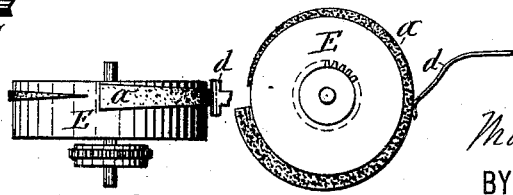
Figure 3:
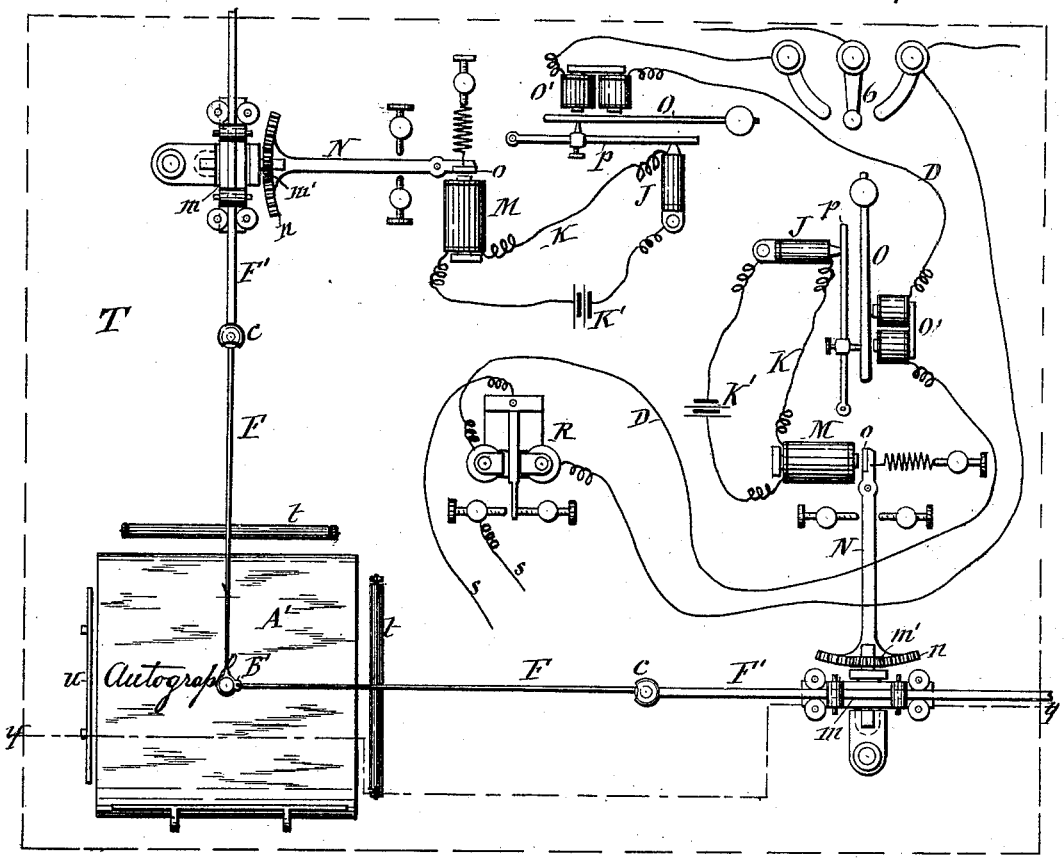
Figure 4:
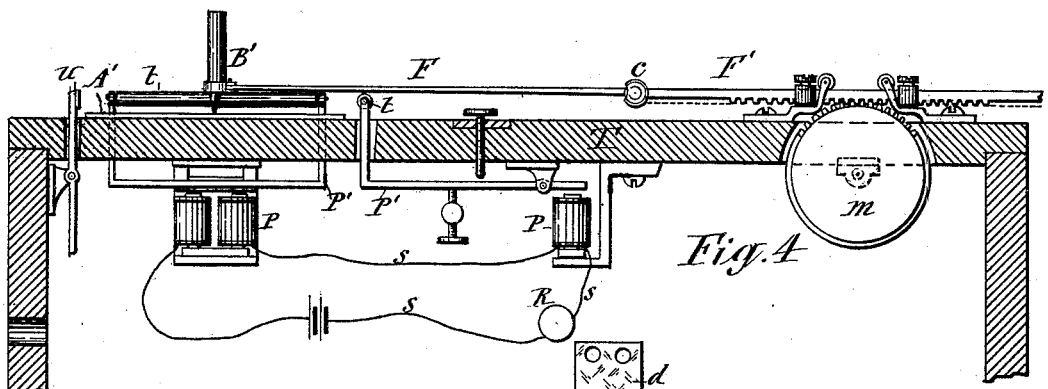
Figure 7:
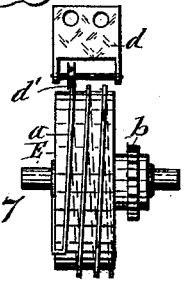
Figure 8:
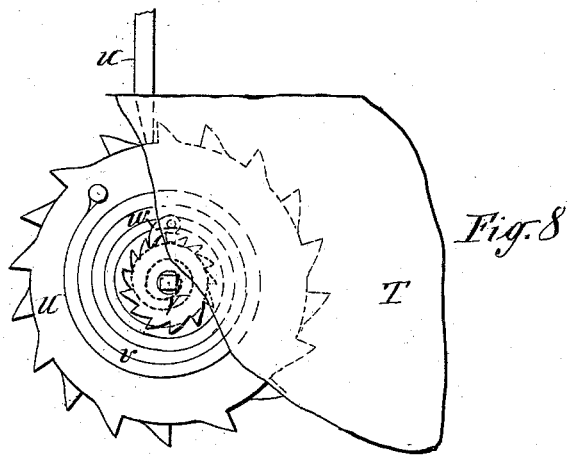
Figure 12:
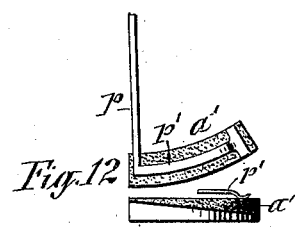
Figure 9:
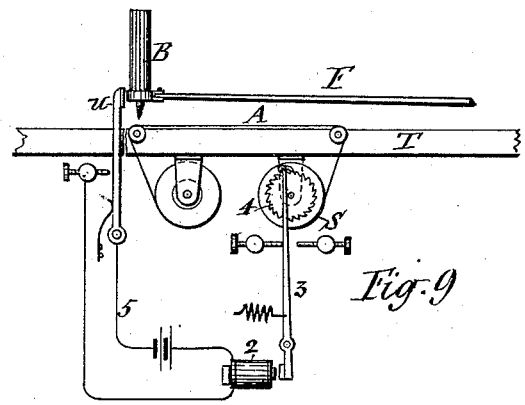
Figure 13:
Figure 10:
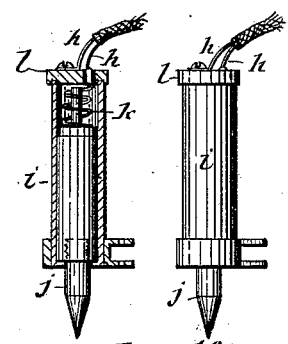
Figure 11:
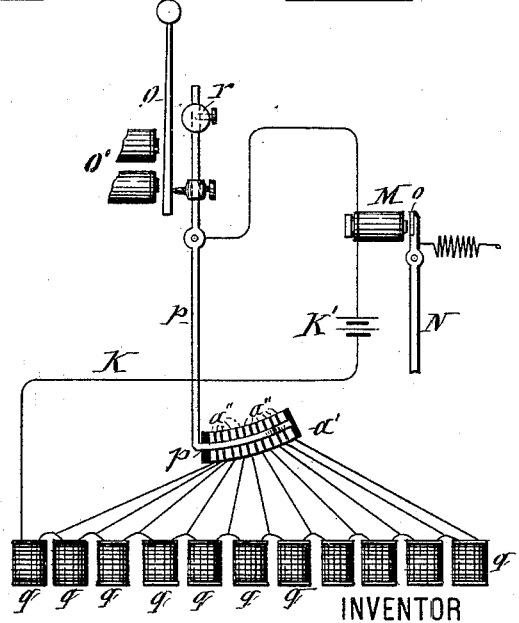

In the annexed drawings, Figure 1 is a plan view of the transmitting-instrument. Fig. 2 is a vertical transverse section on line *x x*, Fig. 1. Fig. 3 is a plan view of the receiving-instrument. Fig. 4 is a vertical transverse section on line *y y*, Fig. 3. Figs. 5 and 6 are respectively top and side views of devices for controlling or varying the resistance in the circuit. Fig. 7 is a face view of the preferred form of the said controlling or varying devices. Fig. 8 is a side elevation of the devices for automatically moving the paper at the transmitting-station. Fig. 9 illustrates a modification of the same. Fig. 10 shows detached enlarged views of the exterior and interior of the stylus. Fig. 11 is a detached plan view of my preferred form of the devices for varying the resistance in a circuit. Fig. 12 presents plan and side views of my preferred form of the resistance, and Fig. 13 presents plan and side views of a modification of said preferred resistance.

Similar letters of reference indicate corresponding parts.

A and A' represent the sheets of paper or other suitable material designed to receive, respectively, the impressions or inscriptions of the transmitting stylus or pen B and of the receiving stylus or pen B'.

C and C' denote rheostats or variable resistances, which are in branches D' D' of the main-line circuit D, and are operated by the aforesaid transmitting stylus or pen. In order to allow the stylus or pen an extensive range of movement, so as to allow a number of words or lines to be imprinted, traced, or written on the paper A without moving the latter, I employ rheostats or variable resistances of the following peculiar form and peculiar connections of said parts. Said rheostat or variable resistance consists, essentially, of a path *a* of semi-conducting material, presenting gradually or evenly-progressive increasing resistance to the current in the circuit, and preferably distributed circumferentially on a drum or wheel E, as described in another application for Letters Patent about to be filed by me. Said path may be formed of uniform thickness and of gradually-increasing width, as shown in Fig. 5 of the drawings, or formed of gradually-increasing thickness, as represented in Fig. 6 of the drawings, or in the shape of an electric conductor extended spirally around the peripheral face of the drum or wheel E, as illustrated in Fig. 7 of the drawings. These rheostats or variable resistances are operated by longitudinally-movable rods F F, which are disposed at right angles to each other, and carry conjointly at one end the stylus or pen or other suitable manipulative instrument.

For the purposes hereinafter explained, I prefer to transmit motion from the rods F F to the rheostats or variable resistances by means of a pinion $b$, secured to the side of each of the drums or wheels E, so as to rotate synchronously therewith, and with the said pinion engages a rack F', which is guided rectilinearly by guide-rollers $e\ e'$, and has one end connected with one of the rods F by a ball-and-socket joint or other suitable and well-known universal joint $c$, which allows the end of the rod F, which carries the stylus or manipulative instrument B, to be raised and lowered.

$d$ represents an electric conductor, which rides on the path $a$, and is preferably formed of a spring-metal plate having pivoted to it an electric conducting-roller $d'$, which rides or travels on the path $a$, as illustrated in Fig. 7 of the drawings, thereby obviating friction and abrasion. The path $a$, of semi-conducting material, is electrically connected with the shaft of the wheel E, either by forming the said wheel of metal or by extending a conducting-arm from the said path to the axle, as shown in Fig. 7 of the drawings, in which latter case the wheel is composed of non-conducting material. The shaft of the said wheel is mounted in metallic bearings $f f$, to one of which one of the wires of the branches D' of the main-line circuit is connected, the other wire of said branch being connected to the conductor $d$, which rides on the path $a$ of the rheostat C.

G G represent two pole-changers, which I prefer to connect to one lever, and thus obtain a compound pole-changer adapted to change simultaneously the polarities of two electric currents. The lever of the said compound pole-changer is provided with the usual armature $g$, operated by the magnet H in a local circuit $h$, of which I represents the battery, the terminals of which local circuit are connected with the stylus or pen in the manner hereinafter described, each of said pole-changers being in one of the branches D' of the main-line circuit, and in each of the branches is also a reed or electrotome L, which is continuously vibrated by magnets L' in a local circuit, said reeds having the same amplitude of vibration, and one vibrating a greater number of times per second than the other.

The manipulative instrument or stylus or pen B, I make to serve the additional function of a circuit maker and breaker by forming the same of a sleeve or tubular handle $i$, which is preferably composed of non-conducting material, and in which slides longitudinally the stylus or pen proper $j$, which may be of any suitable construction to produce the desired impression or inscription upon the paper A, and is held yieldingly protruded from one end of the sleeve $i$ by means of a spring $k$, interposed between the upper end of the stylus and cap $l$ of the aforesaid sleeve. The said cap is composed of metal or other suitable electric conducting material, to which is attached one of the wires of the local circuit $h$, hereinbefore referred to, the other wire of said circuit passing through the said cap and insulated therefrom and being secured to the upper end of the stylus or pen $j$, which is also composed of metal and adapted to spring into and out of contact with the cap $l$.

In the receiving-instrument, Fig. 3, the racks F', which operate the stylus-carrying rods F, engage gear-wheels $m$, pivoted to suitable supports secured to the table T. To the shaft of each of these gear-wheels is rigidly secured a pinion $m'$, which meshes with the rack $n$, secured to one end of a pivoted lever N, to the opposite end of which is attached an armature $o$, facing a magnet M in a local circuit K, of which K' denotes the battery. In this local circuit is also a variable resistance J, which bears on the free end of a lever $p$, held normally in contact with the reed O, said reed being vibrated by impulses in magnets O' in the main-line circuit D.

In order to obviate undue resistance to the vibration of the reed, I may form the variable resistances similar to those of the transmitting-instrument—i. e., I employ a path $a'$, either composed of semi-conducting material and of gradually-increasing width or increasing depth, as shown in Figs. 12 and 13 of the drawings, or composed of a series of electric contact-points $a''$ with interposed resistances, which in this case are of the form of coils of wire $q\ q$, and the lever $p$ being formed with a laterally-projecting finger or brush $p'$, which is dragged across the path $a'$ by the movement of the said lever. It will be observed that by this arrangement I obtain a greater range of resistance, and consequently also a greater range of movement of the stylus or pen.

In order to allow the lever $p$ to be adjusted to the requisite sensitiveness of movement, I connect thereto adjustably longitudinally a weight $r$, as illustrated in Fig. 11 of the drawings.

R designates a polarized relay, which is also in the main-line circuit. Said relay controls the local circuit $s\ s$, in which are included magnets P P, which operate levers P' P', carrying under the rods rollers $t$, pivoted to said levers. These levers, when operated by the magnets, raise the rods F, and thereby lift the stylus or pen B' from the paper A'.

In my described autographic telegraph I operate the feed mechanism of the paper receiving the inscription automatically with the movement of the stylus or pen to a predetermined position, and this I accomplish either electrically or mechanically, preferably by the latter.

To one end of the feed-roller S, I firmly secure an escapement-wheel U of any suitable and well-known form, and a detent $u$, pivoted to the table T, has one end engaging the aforesaid escapement-wheel and the opposite end in the path or field of movement of the stylus or pen B.

Concentric with the escapement-wheel U, and rotatable independently thereof, is a ratchet-wheel V, and a coil-spring $v$ is at one end connected to the hub of the ratchet-wheel and at the opposite end to the escapement-wheel, the ratchet-wheel being provided with a suitable post for the application of a key by which to wind up the aforesaid spring, and a dog $w$, pivoted to the side of the table T and engaging the ratchet-wheel, serves to prevent the reverse movement thereof, the feed-roller S being thus normally restrained in its movement, and by carrying the stylus or pen B of the transmitting-instrument into and out of contact with the detent $u$ the escapement-wheel is allowed to turn the distance of two of its teeth, and thus the feed-roller is likewise allowed to move a corresponding distance, and thereby shifts the paper A when desired to present a blank portion of the paper. When desired to accomplish the shifting of the paper electrically, it may be done by employing in lieu of the detent $u$ a circuit making and breaking lever, likewise arranged in the path of the stylus or pen, and in a local circuit 5, having a magnet 2, which, when energized, operates a lever 3, carrying a pawl which engages a ratchet-wheel 4, attached to the end of one of the feed-rolls S, and each impulse through the magnet produces a partial rotation of the said feed-roll, as illustrated in Fig. 9 of the drawings.

It is obvious that in most instances one of the described transmitting-instruments and one of the receiving-instruments are to be located at each end of the line and connected with one and the same line-circuit, and also suitable switches 6 6 are to be connected in the main line for the purpose of including or cutting out the instruments, as desired.

In the operation of my invention the operator traces or marks on the paper A at the transmitting-station the letters or characters by means of the stylus or pen B. In this operation the rods F F, carrying the said stylus or pen, are caused to follow the movement of the stylus and actuate the rheostats or variable resistances C C', which vary the strength of the current in the branches D' in the main line, and the reeds break the current up into intermittent impulses of varying strength. The two reeds having the different rate of vibration, as heretofore stated, produce composite impulses in the line actuating the reeds O O at the receiving-station, producing corresponding rates of vibration and amplitude corresponding to the strength of the impulses. The vibrations of the reeds O O control the variable resistances J J in the local circuits K K, causing the magnets M in said circuits to operate the levers N with a force corresponding to the impulses in the line.

It will be observed that by the employment of the variable resistance J and lever $p$ with the reed O the intermittent impulses of varying strength in the main line are converted into a continuous undulatory current in the local circuit K, and therefore the lever N receives a gradual movement corresponding to the gradual movement of the stylus of the transmitting-instrument. The movement of the lever N is transmitted to the stylus B of the receiving-instrument by means of the rack $n$, pinion $m'$, gear $m$, rack F', and rod F connecting said rack with the stylus. Consequently the stylus of the receiving-instrument is compelled to move corresponding to the movement of the stylus of the transmitting-instrument in all of its various directions. When it is desired to begin a new line of writing or make erasures or corrections of matter already written, the operator lifts the combined circuit maker and breaker and stylus or pen from the paper, and in doing so he breaks the local circuit $h\,h$, changing the polarity of currents in the branches of the main line and in the main line, independent of the operation of the rheostats, by means of the pole-changers G G, the aforesaid position being illustrated in Fig. 1 of the drawings. The changes of the polarity in the line effect the movements of the armature of the polarized relay R at the receiving-station. The movements of the said armature make and break the local circuit $s$, which include the magnets P P, said magnets being caused, when energized, to operate the levers P', so as to lift the rods F F and thus raise the stylus or pen B from the paper A at the receiving-station. Hence it will be observed that this latter stylus or pen is caused to rise from the paper simultaneously with the lifting of the stylus or pen at the transmitting-station. When it becomes necessary to shift the paper A, the operator lifts the stylus or pen from the paper and presses said stylus against the detent or lever $u$. A corresponding movement being produced in the stylus or pen of the receiving-instrument likewise causes the paper to be shifted at the receiving-station in the manner hereinbefore described.

Having described my invention, what I claim as new, and desire to secure by Letters Patent, is—

1. In combination with the manipulative instrument and a rod carrying said instrument, a rotary variable resistance operated by the said rod and consisting of a wheel and a path of semi-conducting material extended spirally around said wheel, and an electric contact riding on said semi-conducting material, as set forth.

2. In combination with the manipulative instrument and two longitudinally-movable rods disposed at an angle to each other and carrying conjointly at one end the aforesaid instrument, rotary resistances operated, respectively, by the aforesaid rods, and each of said resistances consisting of a wheel, a path of semi-conducting material extending spirally around said wheel, and an electric contact riding on said semi-conducting material, substantially as set forth.

3. In combination with the manipulative instrument, a rotary resistance consisting of a wheel, a path of semi-conducting material extended spirally around said wheel, an electric contact riding on said semi-conducting material, a longitudinally-movable rod turning the said wheel, and a supplemental rod connected at one end to the reciprocating rod by a universal joint and carrying on its opposite end the aforesaid instrument, as set forth.

4. In combination with the manipulative instrument, a rotatable resistance, a pinion moving synchronously with said resistance, a rack engaging the pinion, and a rod connected at one end to said rack by a universal joint and carrying on its opposite end the aforesaid instrument, substantially as specified and shown.

5. In combination with the manipulative instrument, a rheostat or variable resistance consisting of a path of semi-conducting material presenting gradually-increasing in contradistinction of step-by-step resistance to the current of an electric circuit, an electric conductor arranged movably on said path, and two rods coupled together by universal joint and connected at one end to the manipulative instrument and operating by the opposite end the aforesaid rheostat or variable resistance, as described.

6. In combination with the manipulative instrument and two longitudinally-movable rods disposed at right angles to each other and carrying conjointly at one end the aforesaid instrument, racks connected, respectively, to said rods by universal joints, pinions engaging the racks, and rotatable resistances each moving synchronously with one of the pinions, substantially as described and shown.

7. The combination, with the main-line circuit, branches of said circuit, and batteries, of reeds or electrotomes in said branches, the stylus or pen, rods arranged at angles to each other and movable conjointly and universally and carrying conjointly at one end the aforesaid stylus or pen, and variable rotary resistances connected with said rods and controlled by the movement of said rods and included in the aforesaid branches, substantially as set forth.

8. The combination, with an electric circuit and a manipulative instrument, of two reeds or electrotomes, two rheostats each consisting of a path of semi-conducting material presenting an evenly-progressive increasing resistance to the electric current, electric conductors traveling, respectively, on the paths of the two rheostats, and rods disposed at right angles to each other and connected at one end to the manipulative instrument and operating with their opposite ends, respectively, the two rheostats.

9. The combination, with an electric circuit and a manipulative instrument, of a reed or electrotome, a rheostat in said circuit and consisting of a path of semi-conducting material presenting an evenly-progressive increasing resistance to the current in said circuit, an electric conductor traveling on said path, and a rod connected to the manipulative instrument and operating the said rheostat.

10. The combination, with the manipulative instrument, the main-line circuit, and branches of said circuit, of two rheostats in said branches, reeds, or electrotomes, each of said rheostats consisting of a wheel, a path of semi-conducting material extending spirally around said wheel and presenting gradually-increasing resistance to the current in the branch, electric conductors traveling, respectively, on the said paths of the two rheostats, and rods disposed at right angles to each other and carrying conjointly at one end the manipulative instrument and operating with their opposite ends, respectively, the aforesaid rheostats, as set forth.

11. In combination with the main-line circuit and a branch of said circuit, a rheostat in said branch consisting of a path of semi-conducting material presenting gradually-increasing resistance to the electric current, an electric conductor traveling on said path, and a reed or electrotome in the branch with the rheostat, as set forth.

12. In combination with a manipulative instrument, a rheostat included with a reed or electrotome in a branch of the main-line circuit, said rheostat consisting of a path of semi-conducting material presenting gradually-increasing resistance to the current in the branch, an electric conductor to travel on said path, and a rod carrying at one end the manipulative instrument and operating with its opposite end the aforesaid rheostat, as set forth.

13. In combination with a manipulative instrument, two rheostats included with reeds or electrotomes in branches of the main-line circuit, each of said rheostats consisting of a path of semi-conducting material presenting gradually-increasing resistance to the current in the branch, and electric conductors traveling, respectively, on the paths of the rheostats, and rods disposed at right angles to each other and carrying conjointly at one end the aforesaid manipulative instrument and operating with their opposite ends the respective rheostats, as set forth.

14. The combination, with an electric circuit and a branch of said circuit, of a variable rheostat in said branch, a reed or electrotome in the branch with the rheostat, a transmitting-instrument of an autographic telegraph, and a pole-changer in said circuit controlled by the movement of the transmitting-instrument at right angles toward and from the plane of the writing-sheet, as specified.

15. The combination, with an electric circuit and a branch of said circuit, of a variable rheostat in said branch, a reed or electrotome in the branch with the rheostat, a transmitting-instrument of an autographic telegraph, and a pole-changer in said circuit operated by a magnet in a local circuit the current through which is controlled by the movement of the aforesaid transmitting-instrument toward and from the writing-sheet, substantially as described.

16. The combination, with an electric circuit and a branch of said circuit, of a variable rheostat in said branch, a reed or electrotome in the branch with the rheostat, a transmitting-instrument, a rod extended from said instrument and provided with a joint to allow said instrument to be moved toward and from the writing-sheet, a rheostat in the circuit operated by said rod, and a pole-changer also in the circuit operated by the movement of said transmitting-instrument toward and from the writing-sheet, as specified.

17. In combination with the manipulative instrument, a rheostat consisting of a rotatable drum or wheel having semi-conducting material distributed circumferentially thereon, a pinion moving synchronously with said drum or wheel, a rack engaging said pinion, a rod connected at one end to the rack by a universal joint and carrying on the opposite end the aforesaid manipulative instrument, and a pole-changer operated by the raising and lowering of the manipulative instrument.

18. The combination, with the manipulative instrument, a main-line circuit and branches of said circuit, of a variable rheostat in each of said branches, a reed or electrotome in each of said branches with the rheostat, rods connected to said instrument and disposed at right angles to each other to operate the rheostats, and a pole-changer with batteries in said branches to change the polarity of the current in the circuit when the instrument is raised above the writing-surface, as set forth.

19. In combination with the universally-movable manipulative instrument, a local electric circuit controlled by said instrument, a magnet in said circuit, a compound pole-changer operated by said magnet and adapted to change simultaneously the polarities of two electric currents from separate batteries, as set forth.

20. In combination with the main-line circuit and branches of said circuit, the universally-movable manipulative instrument, a separate battery in each of said branches, a local electric circuit controlled by said instrument, a magnet in said circuit, and a compound pole-changer in the branches operated by said magnet and adapted to change the polarity of the current in said circuit and its branches, as set forth.

21. The combination, with the main-line circuit and the stylus of a transmitting-instrument, of a variable resistance in circuit connected with and operated by said instrument, a pole-changer also in said circuit, and means for operating the pole-changer independent of the operation of the said variable resistance.

22. In combination with the stylus or pen connected movably to its handle, electric contacts between said parts, a variable resistance and pole-changer both in the same line-circuit, said pole-changer being operated by the making and breaking of the circuit by the movement of the handle on the stylus or pen, as set forth.

23. In combination with the stylus or pen of an autographic telegraph, a variable resistance consisting of a path of semi-conducting material presenting an evenly-progressive increasing resistance to the electric current, an electric conductor riding on said path, a rod connected at one end with the stylus or pen and operating with its opposite end the aforesaid variable resistance, a reed in circuit, and a pole-changer operated by the said stylus or pen independently of the operation of the resistance, as set forth.

24. In combination with the stylus or pen, variable resistances each consisting of a path of semi-conducting material presenting an evenly-progressive increasing resistance to the electric current, electric conductors riding on the paths, rods disposed at right angles to each other carrying conjointly at one end the stylus or pen and operating with their opposite ends the aforesaid variable resistance, reeds having different rates of vibration in branches of the main-line circuit with the aforesaid variable resistances, pole-changers also in the said branches of the main-line circuit, and means for operating the pole-changers independently of the operation of the resistances, as set forth.

25. In combination with the stylus or pen, variable resistances each consisting of a path of semi-conducting material presenting an evenly-progressive increasing resistance to the electric current, electric conductors riding on the paths, rods disposed at right angles to each other and carrying conjointly at one end the stylus or pen and operating with their opposite ends the aforesaid variable resistances, reeds having different rates of vibration in branches of the main-line circuit with the aforesaid variable resistances, pole-changers also in the said branches of the main-line circuit and operated by the movement of the handle of the stylus or pen, and means for accomplishing the operation of the pole-changers independently of the operation of the said resistances, as set forth.

26. In combination with the stylus or pen, variable resistances each consisting of a path of semi-conducting material presenting gradually-increasing resistance to the electric current, electric conductors riding on the paths, rods disposed at right angles to each other and carrying conjointly at one end the stylus or pen and operating with their opposite ends the aforesaid variable resistances, continuously-vibrating reeds each having a different rate of vibration in branches of the main-line circuit with the aforesaid variable resistances, and pole-changers and batteries, also in the said branches of the main-line circuit, and suitable means for operating the pole-changers through movements of said stylus or pen, but independent of the said resistances, as set forth.

27. In combination with the stylus of a transmitting-instrument controlling a variable resistance in circuit with the receiving-instrument controlling a corresponding stylus, a pole-changer at the transmitting-instrument operated by the movement of the handle of the stylus toward and from the writing-sheet, and a polarized relay at the receiving-instrument responding to the movements of said pole-changer and effecting the movement of the receiving-stylus toward and from the writing-sheet, as set forth.

28. In a receiving-instrument for autographic telegraphs, having a stylus or pen adapted to be moved in all directions, electro-magnets in a line-circuit for controlling the movements of said stylus or pen in a plane parallel with the writing-sheet and corresponding to the movements of the transmitting stylus or pen, a pole-changer operated by the movements of said transmitting stylus or pen at right angles to the plane of the writing-sheet, and a relay in the line-circuit adapted to respond to the changes in the polarity of the current and controlling the movement of the receiving-pen at right angles to the plane of the writing-sheet, substantially as described.

29. In a receiving-instrument of an autographic telegraph, having a pen adapted to be moved in all directions, electro-magnets in a line-circuit for controlling the movements of said pen in a plane parallel with the writing-sheet and corresponding to the movements of the transmitting-pen, a pole-changer operated by the movements of the handle of the transmitting-pen at right angles to the plane of the writing-sheet, a relay in the line-circuit adapted to respond to the changes in the polarity of the current, and a pen-lifter for moving said pen at right angles to the plane of the writing-sheet operated by magnets in local circuit controlled by the movements of said relay, substantially as set forth.

30. In a receiving-instrument of an autographic telegraph, having a stylus or pen, a rod carrying at one end said stylus or pen and arranged movably thereat toward and from the writing-sheet, a lever having one end adapted to lift said rod, a magnet in a local circuit for operating said lever, and a polarized relay controlling the current in said local circuit operating said lever, as set forth.

31. In a receiving-instrument of an autographic telegraph, having a stylus or pen and a longitudinally-movable rod carrying at one end the said stylus or pen and arranged movably thereat toward and from the writing-sheet, a lever having one end adapted to lift said rod, an anti-friction roller interposed between said lever and its lifting-bearing, a magnet in a local circuit, and a polarized relay controlling the current in said local circuit and operating said lever, as set forth.

32. In a receiving-instrument of an autographic telegraph, a magnet in an electric circuit with a variable resistance, which latter is controlled by the stylus or pen of the transmitting-instrument, a pivoted armature adapted to move various distances, according to the degree of attraction of the aforesaid magnet, a rod moved longitudinally by said armature and provided with a universal joint, and the stylus or pen carried on one end of said rod, as set forth.

33. In a receiving-instrument of an autographic telegraph, a magnet in an electric circuit with a variable resistance, which latter is controlled by the stylus or pen of the transmitting-instrument, a pivoted armature adapted to move various distances, according to the degree of strength of the aforesaid magnet, a rod moved longitudinally by said armature and carrying at one end the stylus or pen and movable vertically thereat, a lever adapted to lift said end of the rod, and a magnet in a local circuit controlled by a polarized relay and operating the said lever, as set forth.

34. In a receiving-instrument of an autographic telegraph, the combination, with the stylus or pen, of rods disposed at right angles to each other and carrying conjointly at one end the aforesaid stylus or pen and provided intermediate of their length with a universal joint, magnets in electric circuits with variable resistances, which latter are controlled by the stylus or pen of the transmitting-instrument, and pivoted armatures adapted to move various distances, according to the degree of attraction of the aforesaid magnets, and operating, respectively, the aforesaid rods, as set forth.

35. In a receiving-instrument of an autographic telegraph, a magnet in an electric circuit with a variable resistance, which latter is controlled by the stylus or pen of the transmitting-instrument, a pivoted armature adapted to move various distances, according to the degree of attraction of the aforesaid magnet, a rack attached to said armature, a pinion connected to said rack, a gear pivoted in common with the said rack, a rack engaging the said gear, and a rod connected at one end to the latter rack by a universal joint and carrying at the opposite end the stylus or pen, substantially as described and shown.

36. In a receiving-instrument of an autographic telegraph, the combination of a magnet in an electric circuit with a variable resistance, which latter is controlled by the stylus or pen of the transmitting-instrument, a pivoted armature adapted to move various distances, according to the degree of attraction of the said magnet, a rack attached to said armature, a pinion engaging said rack, a gear pivoted in common with the said pinion, a rack engaging the said gear, a rod connected at one end of the latter rack by a universal joint carrying on the opposite end the stylus or pen, a lever adapted to lift the said rod, and a magnet in a local circuit controlled by a polarized relay and operating said lever, substantially as set forth.

37. In a receiving-instrument of an autographic telegraph, the combination of a magnet with a variable resistance in a local circuit, magnets in the main-line circuit controlling the variable resistance in the local circuit, a pivoted armature adapted to move various distances, according to the degree of strength of the aforesaid magnet, a rod moved longitudinally by said armature and carrying at one end the stylus or pen and movable vertically thereat, a lever adapted to lift said end of the rod, and a magnet in a local circuit controlled by a polarized relay and operating the said lever, as set forth.

38. In a receiving-instrument of an autographic telegraph, the combination of magnets with variable resistances in the local circuits, magnets in the main-line circuit controlling the variable resistances in the local circuits, armatures adapted to move various distances, according to the degree of attraction of the magnets in the local circuits, rods disposed at right angles to each other and operated, respectively, by the aforesaid armatures and carrying conjointly at one end the stylus or pen, levers adapted to lift said rods, and magnets in a local circuit controlled by a polarized relay, substantially as set forth.

39. In a receiving-instrument of an autographic telegraph, a reed or electrotome vibrated by impulses in a magnet in the main line, a magnet and variable resistance in a local circuit controlled by the amplitude of vibrations of the said reed, a pivoted armature adapted to move various distances, according to the degree of attraction of the magnet in the local circuit, a rod moved longitudinally by said armature and carrying on one end the stylus or pen, a lever adapted to lift the said rod, and a magnet in a local circuit controlled by the movement of the polarized relay operating the said lever, as set forth.

40. In a receiving-instrument of an autographic telegraph, the combination, with the main-line circuit, of magnets in said circuit, reeds operated by impulses in the magnets, variable resistances controlled by the amplitude of said reeds, magnets in local circuits with the variable resistances, pivoted armatures adapted to move various distances, according to the degree of attraction of the magnets in the local circuits, rods disposed at right angles to each other and moved, respectively, by the aforesaid armatures and carrying conjointly at one end the stylus or pen, levers adapted to lift, respectively, the aforesaid rods, and magnets in a local circuit controlled by the movement of the polarized relay in the main circuit and operating the aforesaid levers, as set forth.

41. In a receiving-instrument of an autographic telegraph, a reed vibrated by impulses in a magnet in a line-circuit, a pivoted lever normally in contact with said reed, a path presenting increasing resistance to the current in a circuit, and an electric contact carried on the free end of said lever and traversing the aforesaid path, as set forth.

42. In a receiving-instrument of an autographic telegraph, a reed vibrated by impulses in a magnet in a line-circuit, a pivoted lever normally in contact with said reed, a path presenting increasing resistance to the current in a circuit and disposed in a plane parallel with the movement of the lever, and an electric contact carried on the free end of said lever and traversing the aforesaid path, as set forth.

43. In a receiving-instrument of an autographic telegraph, a reed vibrated by impulses in a magnet in a line-circuit, a pivoted lever normally in contact with said reed, a path of semi-conducting material in a plane parallel with the movement of the said lever and presenting increasing resistance to the current in a circuit, and an electric contact carried on the free end of said lever and traversing the aforesaid path, as set forth.

44. In combination with a vibrating reed, a pivoted lever provided with a bearing opposed to the movement of the reed, an adjustable weight on the said lever for adjusting the sensitiveness of the movement of the lever, a path presenting increasing resistance to the current in a circuit and disposed in a plane parallel with the movement of the lever, and an electric contact carried on the free end of the lever traversing said path, as set forth.

45. In combination with a vibrating reed adapted to vibrate with different degrees of amplitude, a vibratory lever provided with a bearing opposed to the movement of the reed, a path presenting increasing resistance to the current in a circuit, and an electric contact carried on the free end of said lever and traversing the aforesaid path, the distance of travel of said contact being governed by the amplitude of vibration of the reed, as set forth.

46. In combination with the stylus or pen, a feed-roller carrying the paper to be imprinted or inscribed, a spring-actuated escapement-wheel attached to said roller, and a detent engaging the said escapement-wheel and arranged in the path of the said stylus or pen to be actuated thereby, as set forth.

In testimony whereof I have hereunto signed my name, in the presence of two witnesses, at Syracuse, in the county of Onondaga, in the State of New York, this 19th day of September, 1888.

MARK W. DEWEY. [L. S.]

Witnesses:
J. J. LAASS,
W. H. RANDALL.